June 22, 1948.　　B. M. BROOKS ET AL　　2,443,947
CONVEYER BELT
Filed Dec. 4, 1945　　2 Sheets-Sheet 1
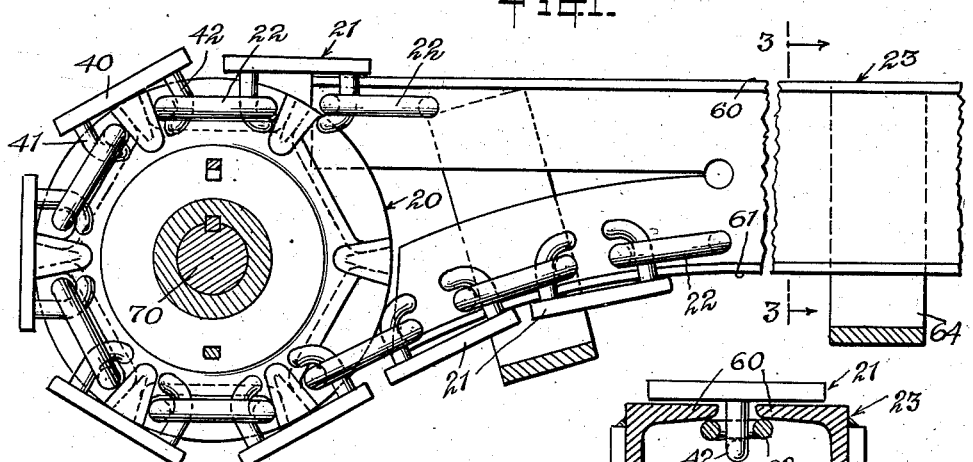
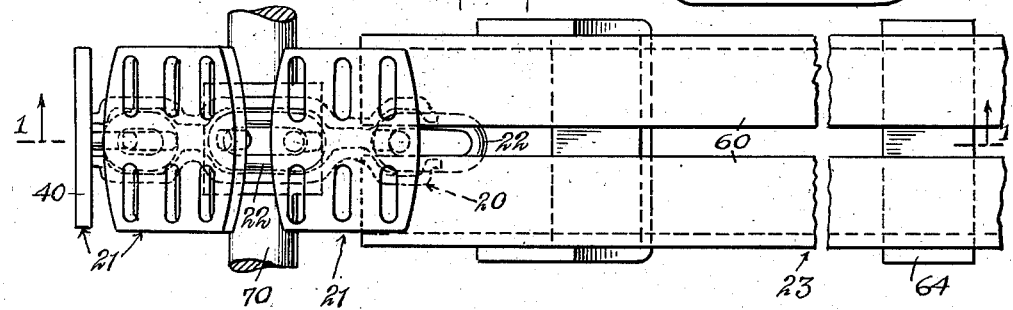
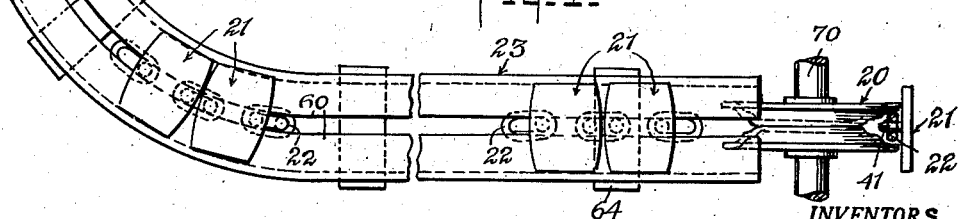
INVENTORS
Buford M. Brooks
and Louis Mirshak
BY
Munn, Liddy & Glaccum
Attorneys June 22, 1948.   B. M. BROOKS ET AL   2,443,947
CONVEYER BELT
Filed Dec. 4, 1945    2 Sheets-Sheet 2
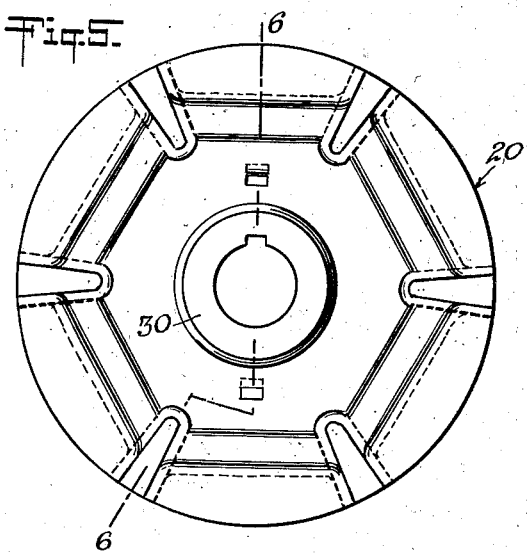
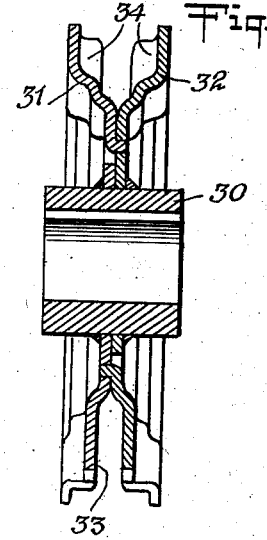
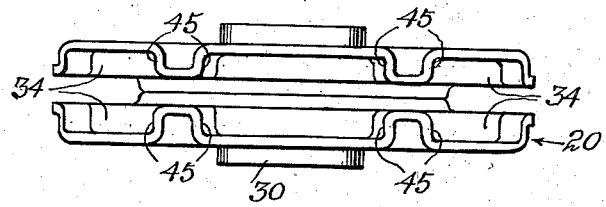
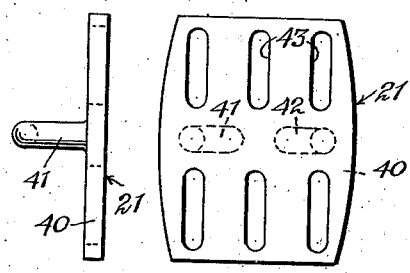
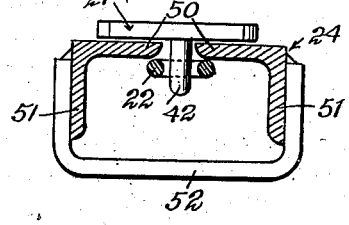
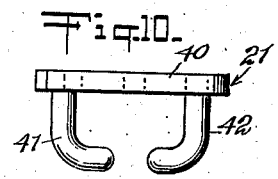
INVENTORS
*Buford M. Brooks
and Louis Mirshak*
BY
*Munn, Liddy & Glaccum*
Attorneys

Patented June 22, 1948

2,443,947

UNITED STATES PATENT OFFICE 2,443,947

CONVEYER BELT

Buford M. Brooks and Louis Mirshak, Dover, N. J.

Application December 4, 1945, Serial No. 632,716

5 Claims. (Cl. 198—189)

This invention relates to conveyors.

The principal object of the invention is a conveyor which is comprised of simple, readily constructed and readily assembled parts, and which may be used for movement on a horizontal plane or on a vertical plane or in both planes at the same time. The construction of this conveyor provides universal flexibility in vertical as well as lateral directions.

A preferred embodiment of the invention is shown in the accompanying drawing in which—

Fig. 1 is a fragmentary vertical section on the line 1—1 of Fig. 2 showing one sprocket wheel of the conveyor, a main track and a return track and a few of the links of the conveyor belt, said belt being an endless belt although not so shown for purposes of clarity;

Fig. 2 is a fragmentary top view of said belt;

Fig. 3 is a vertical section on the line 3—3 of Fig. 1, said view showing how the belt is positioned with respect to the main and return tracks of the conveyor although said belt is not actually shown on the line 3—3 in Fig. 1;

Fig. 4 is a fragmentary top view of the belt shown in Figs. 1 to 3, showing said belt on a horizontally curved track;

Fig. 5 is a side view of the sprocket wheel shown in Fig. 1;

Fig. 6 is a vertical section through said wheel on the line 6—6 of Fig. 5;

Fig. 7 is a peripheral or top view of said sprocket wheel;

Fig. 8 is a top view of one of the carrier plates of said conveyor;

Fig. 9 is a front edge view thereof;

Fig. 10 is a side edge view thereof; and

Fig. 11 is a view of said conveyor belt shown mounted on a track similar to that shown in Fig. 3 except that it is not adapted to return the conveyor belt to its original position.

The conveyor shown in the accompanying drawing comprises a plurality of sprocket wheels 20 as shown in Figs. 5 to 7, inclusive, a plurality of carrier members 21 as shown in Figs. 8 to 10, inclusive, a plurality of links 22 as shown, for example, in Figs. 1 and 3, and a track 23 as shown in Fig. 3 or a track 24 as shown in Fig. 11.

Referring now to the sprocket wheel shown in Figs. 5 to 7, it will be noted that this wheel is provided with a hub 30 and a pair of plates 31 and 32, respectively, which are locked together and which are stamped out to form a circumferential groove 33 which widens out at spaced intervals to form pockets 34.

The conveyor belt proper is comprised of a plurality of carrier members 21 as shown in Figs. 8 to 10 linked together by means of links 22. Each carrier member 21 comprises a carrier plate 40 to the bottom of which are affixed a pair of hooks 41 and 42, respectively. These hooks extend downwardly from the plate 40 and are positioned to face one another. In cross section, the hooks 41 and 42 are curved and preferably circular. The plate 40 has two rounded ends and it is provided with cut outs 43 to reduce its weight. Links 22 are oval in shape and their cross section is substantially circular.

Referring now to Fig. 1, it will be seen that the conveyor proper is formed of a plurality of carrier members 21 linked together by means of links 22, said links connecting the adjacent hooks of adjacent carrier members. It will also be seen in Fig. 1 and also in Fig. 2 that the links 22 are adapted to fit into the pockets 34 of sprocket wheels 29 and that the hooks 41 and 42 are adapted to fit into the groove 33 of said sprocket wheels. At the point where the pockets 34 narrow to form the groove 33, shoulders 45 are provided against which the ends of the links 22 abut. It is at this point of contact between the shoulders 45 and the links 22 that the driving power of the sprocket wheels is communicated to the conveyor belt.

Reference to Fig. 11 will show that the track 24 comprises a pair of spaced bars 50 which are provided with side flanges 51 on their outer sides. These flanges serve simply to reinforce the bars 50 and keep them from bending. The space between bars 50 is wide enough to accommodate hooks 41 and 42. The thickness of bars 50 is such that they are enabled to fit into the space between the carrier plates 40 and the links 22 on both sides of the hooks 41 and 42. Brackets 52 affixed to the side flanges 51 assist in maintaining bars 50 in the positions indicated. Bars 50 not only guide the conveyor belt but they also support it and, more particularly, the carrier plates 40 thereof. As shown in Fig. 11, links 22 prevent upward displacement of the conveyor belt with respect to the bars 50 and the hooks 41 and 42 prevent lateral displacement thereof with respect to said bars.

Track 24 may be curved on a horizontal plane as shown in Fig. 4. It may also be curved upwardly or downwardly although this feature is not shown in the drawing. As has already been indicated, the conveyor belt will follow the track very closely whether it curves on a vertical or on a horizontal plane for the reason that vertical displacement thereof is prevented by the carrier plate 40 and the links 22, and lateral displacement thereof is prevented by the hooks 41 and 42.

The upper part of the track shown in Fig. 3 is identical in all respects with the track shown in Fig. 11. The lower part thereof is also similar to the track shown in Fig. 11 except that it is positioned upside down. As a practical proposition, although there are two tracks shown in Fig. 3, they are formed integrally with each other—the upper half functioning as the main track, the lower half functioning as the return track. More particularly, the track shown in Fig. 3 comprises a pair of spaced upper bars 60 and a pair of spaced lower bars 61, one of the bars 60 being connected to the corresponding bar 61 by means of a side flange 62 which is common to both and the other of said bars 60 being connected to the second of the bars 61 by means of side flange 63 which is integral with said latter bars. Bracket 64 affixed to the flanges 62 and 63 holds the bars 60 and 61 in appropriate spaced relationship. Insofar as upper bars 60 are concerned, the conveyor belt is supported and guided by them in the same manner as is shown in Fig. 11. After the conveyor belt has passed around any one of the sprocket wheels 20, however, and it is on its return trip, it is guided and supported by the bars 61 as shown in Figs. 1 and 3. The hooks 41 and 42 are accommodated by the space between bars 61 and they prevent lateral displacement of the belt as has already been indicated in connection with track 24. The links 22 are carried by the bars 61 and they prevent downward displacement of the conveyor belt. The carrier plates 40 hang below the bars 61 and their function in this connection is to prevent upward displacement of the conveyor belt. Thus it is that when the lower track is curved in a vertical plane as shown in Fig. 1, the conveyor belt is guided along the path described by said track without any trouble. The lower track may also be curved on a horizontal plane as well as a vertical plane.

The above description is of a preferred embodiment of the invention and it is clear that variations and modifications may be incorporated therein without departing from the basic principles of the invention. For example, the sprocket wheel shown in Figs. 5 to 7 inclusive is, exclusive of its hub, stamped out of two sheets of metal which are then locked together and welded to the hub. It is of course perfectly obvious that this sprocket wheel may be cast into shape. The pockets 34 of said wheel correspond in shape to the links 22. Naturally, a differently shaped link would call for a differently shaped pocket as appears in Fig. 1, the sprocket wheel thus shown in the drawing is keyed to a drive shaft 70. This renders the sprocket wheel a drive wheel. It should be understood that sprocket wheels of this general construction may be provided with bearings instead of shaft keys so that they may serve as idlers instead of drive wheels.

The carrier member shown in Figs. 8 to 10 is provided with open slots or cut outs 43. The object, of course, is to reduce the weight of the member but this may be done in different ways and by the use of differently shaped cut outs. This member may be stamped out or cast into shape in accordance with which practice appears more desirable in the particular case. The tracks shown in Figs. 3 and 11 are provided with side flanges. As a practical proposition, the track shown in Fig. 3 is constructed of a pair of channel bars which are U-shaped in cross section and the track shown in Fig. 11 is constructed of a pair of angle irons which are L-shaped in cross section. It should be understood that the side flanges of these tracks may be dispensed with entirely and the tracks proper, members 50 in Fig. 11 and members 60 and 61 in Fig. 3 may be supported and braced by either means.

We claim:

1. A conveyor comprising a plurality of sprocket wheels, a belt mounted on said wheels and a track guiding and supporting said belt, said belt comprising a plurality of carrier plates, hooks on said plates and links connecting the hooks of adjacent plates, said sprocket wheels being provided with peripheral pockets which receive said links, said track comprising a pair of spaced bars which accommodate the carrier plate hooks between them, the carrier plates above them and the links below them.

2. A conveyor comprising a pair of sprocket wheels, an endless belt mounted on said wheels, and a track guiding said belt and supporting at least a part of said belt, said belt comprising a plurality of carrier plates, a pair of hooks affixed to the bottom of each of said plates and facing one another, and links connecting the hooks of adjacent plates, said sprocket wheels being provided with a circumferential groove accommodating said hooks, said groove having enlarged portions which receive said links, said track comprising a pair of spaced, flanged bars which accommodate the carrier plate hooks between them, the carrier plates on top of them and the links underneath them.

3. A conveyor comprising a pair of sprocket wheels having a circumferential groove widening out at spaced intervals to form pockets, an endless belt mounted on said sprocket wheels, said belt comprising a plurality of carrier plates, a pair of downwardly extending hooks affixed to the bottom of each of said plates and facing one another, and oval links connecting the adjacent hooks of adjacent plates, said hooks fitting into the groove of said sprocket wheels and said links fitting into the pockets thereof, and a track for said belt, said track comprising a pair of spaced, flanged bars on which the carrier plates are supported, the hooks of said plates fitting into the space between said bars, and the links fitting underneath said bars between the flanges thereof.

4. A conveyor comprising a plurality of sprocket wheels, a belt mounted on said wheels and a track guiding and supporting said belt, said belt comprising a plurality of carrier plates, hooks on said plates and links connecting the hooks of adjacent plates, said sprocket wheels being provided with peripheral pockets which receive said links, said track comprising an upper pair of spaced bars and a lower pair of spaced bars, said upper pair being adapted to accommodate the carrier plate hooks between them, the carrier plates above them and the links below them, said lower pair being adapted to accommodate the carrier plate hooks between them, the carrier plates below them and the links above them.

5. In combination with a conveyor having hooked carrier members connected by means of links, a main track comprising a pair of spaced bars positioned to receive the hooks of said conveyor between them, the carrier members above them and the links underneath them, and a return track comprising a pair of spaced bars positioned to receive said hooks between them, said links above them and said carrier members underneath them.

BUFORD M. BROOKS.
LOUIS MIRSHAK.

REFERENCES CITED

The following references are of record in the file of this patent:

UNITED STATES PATENTS

| Number | Name | Date |
|---|---|---|
| 556,643 | Ritscher | Mar. 17, 1896 |
| 1,507,888 | McBride | Sept. 9, 1924 |
| 1,635,085 | Johnson | July 5, 1927 |
| 1,748,456 | Pangborn | Feb. 25, 1930 |
| 1,809,748 | Francis | June 9, 1931 |
| 2,073,471 | Franz | Mar. 9, 1937 |
| 2,268,542 | Bergmann | Jan. 6, 1942 |
| 2,321,702 | Renkin | June 15, 1943 |

FOREIGN PATENTS

| Number | Country | Date |
|---|---|---|
| 16,323 | Australia | Nov. 22, 1934 |
| 12,100 | Great Britain | June 3, 1896 |